US008575784B2

(12) United States Patent
Miao et al.

(10) Patent No.: US 8,575,784 B2
(45) Date of Patent: Nov. 5, 2013

(54) LOW VOLTAGE AND INTENSE CURRENT PHASE-CONTROLLED SWITCHING ON EQUIPMENT

(75) Inventors: Benjian Miao, Dongguan (CN); Zhili Lin, Dongguan (CN); Daosheng Ma, Dongguan (CN); Weiwen Liang, Dongguan (CN); Xu Li, Dongguan (CN)

(73) Assignee: China Dongguan Guang an Electrical Centre Co., Ltd, Dongguan (CN)

( * ) Notice: Subject to any disclaimer, the term of this patent is extended or adjusted under 35 U.S.C. 154(b) by 904 days.

(21) Appl. No.: 12/625,580

(22) Filed: Nov. 25, 2009

(65) Prior Publication Data

US 2011/0012614 A1 Jan. 20, 2011

(30) Foreign Application Priority Data

Jul. 16, 2009 (CN) .......................... 2009 1 0041185

(51) Int. Cl.

*H01H 47/00* (2006.01)
*H01H 83/00* (2006.01)
*H02J 7/00* (2006.01)

(52) U.S. Cl.

USPC .......................................................... 307/125

(58) Field of Classification Search

USPC .......................................... 307/125; 218/1, 2
See application file for complete search history.

(56) References Cited

U.S. PATENT DOCUMENTS 5,559,426 A * 9/1996 Shea et al. .................... 323/319
2008/0308531 A1* 12/2008 Tsuchiya et al. .............. 218/118

* cited by examiner

*Primary Examiner* — Carlos Amaya

(57) ABSTRACT

The present invention relates to low voltage electrical equipment testing technique, more particularly, to a low voltage and intense current phase-controlled switching on equipment, comprising: a frame, at least an vacuum arc extinguish chamber, at least a permanent magnet control device and at least a intelligent phase choosing controlled module, with the vacuum arc extinguish chamber and the permanent magnet controlled device mounted on the frame, wherein the vacuum arc extinguish chamber comprises at least a movable contact and a isolated pull rods connected to the movable contact, and the permanent magnet controlled device comprises electromagnetic coils, movable iron cores and output shafts connected to the movable iron cores, and a transmission system is arranged to connect to the isolated pull rod and the output shaft, with the intelligent phase choosing controlled module electrically connected to the electromagnetic coils of the permanent magnet controlled device.

7 Claims, 4 Drawing Sheets

LOW VOLTAGE AND INTENSE CURRENT PHASE-CONTROLLED SWITCHING ON EQUIPMENT

FIELD OF THE INVENTION

The present invention relates to low voltage electrical equipment testing technique, and applies in the professional low voltage electrical equipment testing station and the intense current phase-controlled switching on testing, more particularly, the present invention is directed to a low voltage and intense current phase-controlled switching on equipment acted as a high accuracy phase-controlled switching on switch during the short-circuit test on the electrical equipment, like transformer and fuse box, etc.

BACKGROUND OF THE INVENTION

With the continuously updated of modern science and technology, the rapid development of the domestic electric industry, and the increasingly competitive international market, the high/low voltage electrical equipments around the world emerge one after another. International Electrotechnical Commission promulgates a series of standards on electrical equipments, especially for the switching equipments of the electrical equipments, it requires controlling not only the testing voltage and current, but also the switching on phase angle and the breakover circle or waveform, as the testing voltage, testing current, and the switching on phase angle are the requirements for "short-circuit breaking and switching on/off capacity test" of the electrical equipments. The switching on/off phases of the switches within the current high and medium voltage systems are random, therefore the phenomenon of overvoltage and inrush current is very serious, and it cause a negative impact on the electric system operation and the performance of electrical equipments, the concrete embodiment as follows: shortenings the electrical equipment life, the insulation puncture and damage of the electrical equipment, the malfunction of relay protection, the malfunction of the quadratic electronic controlling component, and decreasing the electric power quality, etc.

In view of the above reasons, we give sufficient attention to the research and development of the switching on/off phase control of the switching equipment, and we consider that the research and development of the switching on/off phase control is the top priority for future research and development of the switching equipment.

SUMMARY OF THE INVENTION

In view of the prior art drawbacks, the objective of the present invention is to overcome the problem that the switching on/off current of the phase-controlled switching on equipment in the previous low voltage electrical equipment laboratory is too low, and the switching on accuracy is too low, providing a new low voltage and intense current phase-controlled switching on testing equipment. This equipment is capable of switching on with the specified phase under the system voltage waveform, thereby ensuring the reliability of low voltage electrical experiments, and the greatly improved test accuracy and working efficiency is obtained.

In order to achieve the above objective, the present invention low voltage and intense current phase-controlled switching on equipment is carried out through the following technical solutions.

A low voltage and intense current phase-controlled switching on equipment comprises: a frame, at least an vacuum arc extinguish chamber, at least a permanent magnet control device and at least a intelligent phase choosing controlled module, with the vacuum arc extinguish chamber and the permanent magnet controlled device mounted on the frame, wherein the vacuum arc extinguish chamber comprises at least a movable contact and a isolated pull rod connected to the movable contact, and the permanent magnet controlled device comprises electromagnetic coils, movable iron cores and output shafts connected to the movable iron cores, and a transmission system is arranged to connect to the isolated pull rod and the output shaft, with the intelligent phase choosing controlled module electrically connected to the electromagnetic coils of the permanent magnet controlled device.

The present invention meet the national standard GB1984-2003 "high-voltage alternating current (AC) circuit breaker" and the industry standard JB3855-1996, when the intelligent phase choosing controlled module sending order to impose the switching on/off voltage and current on the electromagnetic coils of the permanent magnet controlled device via the lead wire to produce electromagnetic force after receiving switching on/off controlling signal, start the movable iron cores of the permanent magnet controlled device, and drive the isolated pull of the vacuum arc extinguish chamber via the output shaft of the permanent magnet controlled device, thereby driving the movable contact of the arc extinguish chamber to reach the objection of switching on/off of the phase-controlled switching on equipment.

The above technical solution employs the vacuum arc extinguish chamber characteristic of high performance and long life. The vacuum arc extinguish chamber is mounted within the isolated housing made of epoxy resin, which not only prevents the vacuum arc extinguish chamber from the damage of the external factors, but also raises the level of external insulation of the arc extinguish chamber. The contact of the arc extinguish chamber is using copper-chromium alloy materials, with the structure thereof being goblet longitudinal magnetic field contact. The contact is characteristic of low electro erosive wear rate, long power life, high pressure resistance, stable medium insulation tension, rapid arc recovery, low interception level and good switching on/off ability.

As improving the above technical solution, the permanent magnet controlled device is constitute of the movable iron cores, static iron core inner coils, static iron core outside coils, the electromagnetic coils, device output shafts and permanent magnets. The structure of the permanent magnet device according to the above technical solution is reasonable with simple transmission, and the switching on status is maintained by the magnetism of the permanent magnet, with stable movement being obtained through giving a small pulse current to the coils when switching on/off operation, which achieves low power consumption. The permanent magnet controlled device is under electronic control, thereby achieving accurately controlling the moveable portion, simple wire connections, small volume and low cost.

The intelligent phase choosing controlled module according to the above technical solution chooses the voltage signal input from exterior as the reference signal, controlling the switching on equipment to complete the phase-controlled switching on timely and accurately, under the predesigned voltage phase (the electrical angle). The intelligent phase choosing controlled module comprises: switching on switches, reservoir capacitances, position switches and a controlling unit, and the switching on switches, the reservoir capacitances and the position switches are electrically connected to the controlling unit respectively, wherein the reservoir capacitances are in parallel connected with the electromagnetic coils of the permanent magnet controlled device, and the controlling unit has the switching on mode locking switches set therein, with the switching on mode locking switches equipped with power input ports and voltage phase synchronized-signal input ports, the switching on switches and the switching on mode locking switches both are two-position switch.

As improving the above technical solution, the switching on mode locking switches are characteristic of two positions, with the two positions electrically connected to the position switches via coils respectively.

As improving the above technical solution, the controlling unit is equipped with a jumper terminal JP1 having a plurality of pins, with one port of the position switch connected to the switching on mode locking switch via the two pins of the jumper terminal JP1, two port of the two positions of the switching on switch connected to the another two pins of the jumper terminal JP1 respectively, and both the other ports of the position switch and the switching on switch connected to the another one pin of the jumper terminal JP1 in parallel, and the power input ports and the voltage phase synchronized-signal input ports are connected to the other pins of the jumper terminal JP1.

As improving the above technical solution, the equipment comprises computer data exchange interfaces matched the jumper terminal JP1, with the jumper terminal JP1 connected to the computer via the computer data exchange interfaces, and the connection relationship of each pin of the jumper terminal JP1 could be defined through programming.

Preferably, the computer data exchange interfaces employ optoisolated RS232 ports.

For instance, the jumper terminal JP1 has 13 pins, which could be defined as follow:

The ports 1-2 of the jumper terminal JP1 are working power input ports, which are connected to the power supply characteristic of alternating current/direct current 220V±20%; the ports 11-12 of the jumper terminal JP1 are the voltage phase synchronized-signal input ports, which are connected to the power supply characteristic of 100~220V; and the port 13 of the jumper terminal JP1 is a switching on controlling bus, which is connected to the port 3 to form a switching on order controlling loop, and connected to the port 4 to form a switching off order controlling loop. The switching on controlling bus and the ports 5-6 constitute a switching on/off position loop via the switching on mode locking switch, which provide the operation locking controlled logic which is requirement.

During the switching on equipment running, wire up, and then a controlling system is starting to test the switch mode and going into operation. The reservoir capacitances have completed the first accumulation energy in 20 seconds, afterwards it would complete the supplementary accumulation energy in 15 seconds, and the capacitances voltage is maintain in the factory-set. When getting through the switching on order controlling loop, and the switching on mode locking switch is at the switching off position, the switching on order comes into effect, then the controlling unit tracks the voltage phase synchronized-signal to make the reservoir capacitances to dicharge to the electromagnetic coils of the permanent magnet controlled device in forward direction so as to complete the switching on operation, at the predetermine synchronous time point. When getting through the switching off order controlling loop, and the switching on mode locking switch is not at the switching position off, the switching off order comes into effect, the controlling unit withdraw all the other order, to make the reservoir capacitances to dicharge to the electromagnetic coils of the permanent magnet controlled device in reverse direction so as to complete the switching off operation. Provide the electromagnetic coils with the pulse current in forward/reverse direction, the electromagnetic coils would generate combined magnetic force build by the magnetic field of the electromagnetic coils and the permanent magnet, so as to drive the movable iron core to switching on/off, and indirectly drive the vacuum arc extinguish chamber to switch on/off via device input shaft.

In comparison with the prior art, the advantages of the present invention are as follow:

(1). The present invention can accurately control the switching on phase angle, with the switching on stability reaching ±0.2 ms, achieving switching on at the random angle as the user required, solving the problem that the switching on equipment could not choose phase to switch on or the accuracy thereof is not good, in the previous low voltage electrical equipment laboratory, such that the efficiency of equipment test is highly enhanced.

(2). The preset invention employs a method of multiple connections in parallel, so as to solve the problem that the switching on/off current of the previous testing equipment can not reach the level of 150 kA, filling the room of this field in domestic, and being in favor of improving the overall level of the low-voltage electrical manufacturing in China.

(3). The present invention is characteristic of simple structure, long life, high reliability, great anti-electromagnetic interference capability, advanced control technology, convenient communications, completed operation function, and without explosive danger.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

The present invention will now be further described with reference to the figures and the embodiment hereinafter, however, it is not intended to limit the scope of protection of the present invention through the following description, the field technician can easily reach all of the changes and improvements should fall within the scope of protection is not the invention, and such modifications and variations that may be apparent to those skilled in the art are intended to be included within the scope of the present invention.

Figure 1:
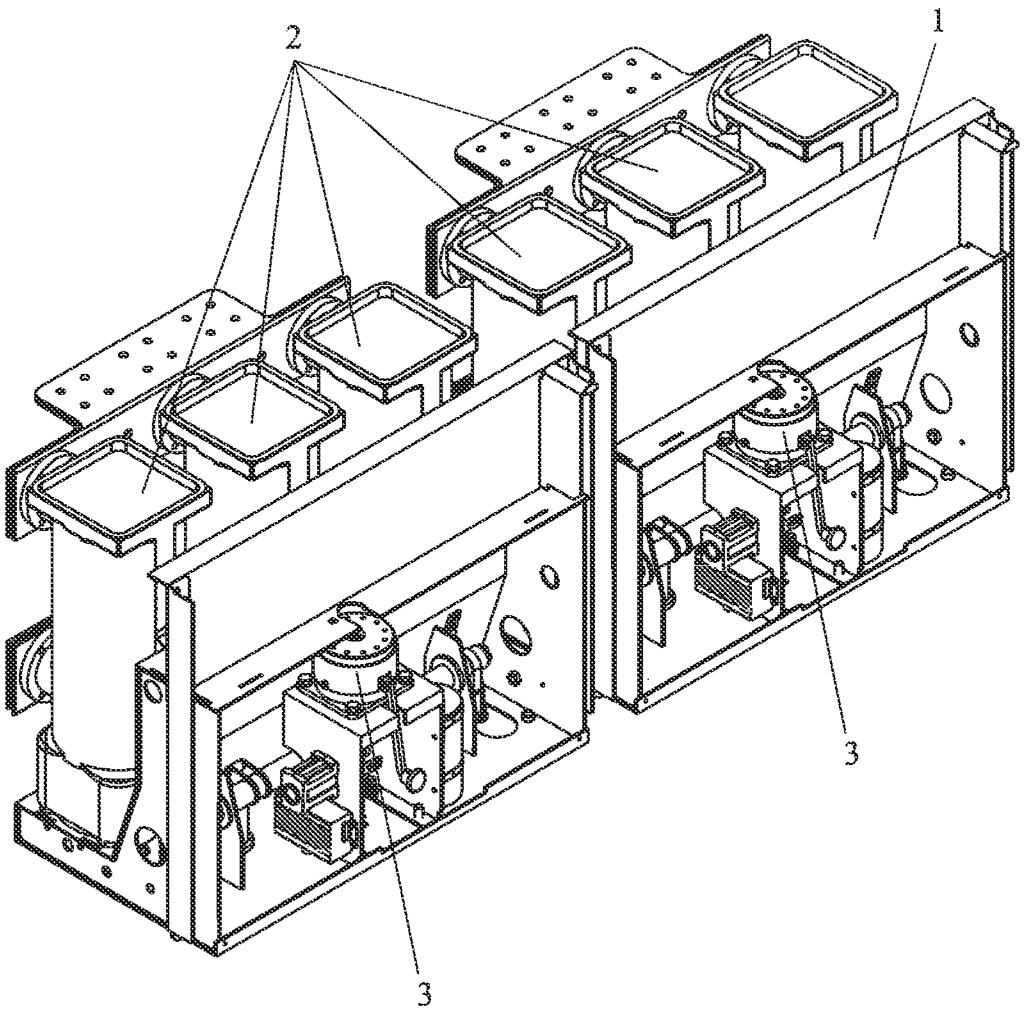
FIG. 1 is a perspective view of a low voltage and intense current phase-controlled switching on equipment.
Figure 2:
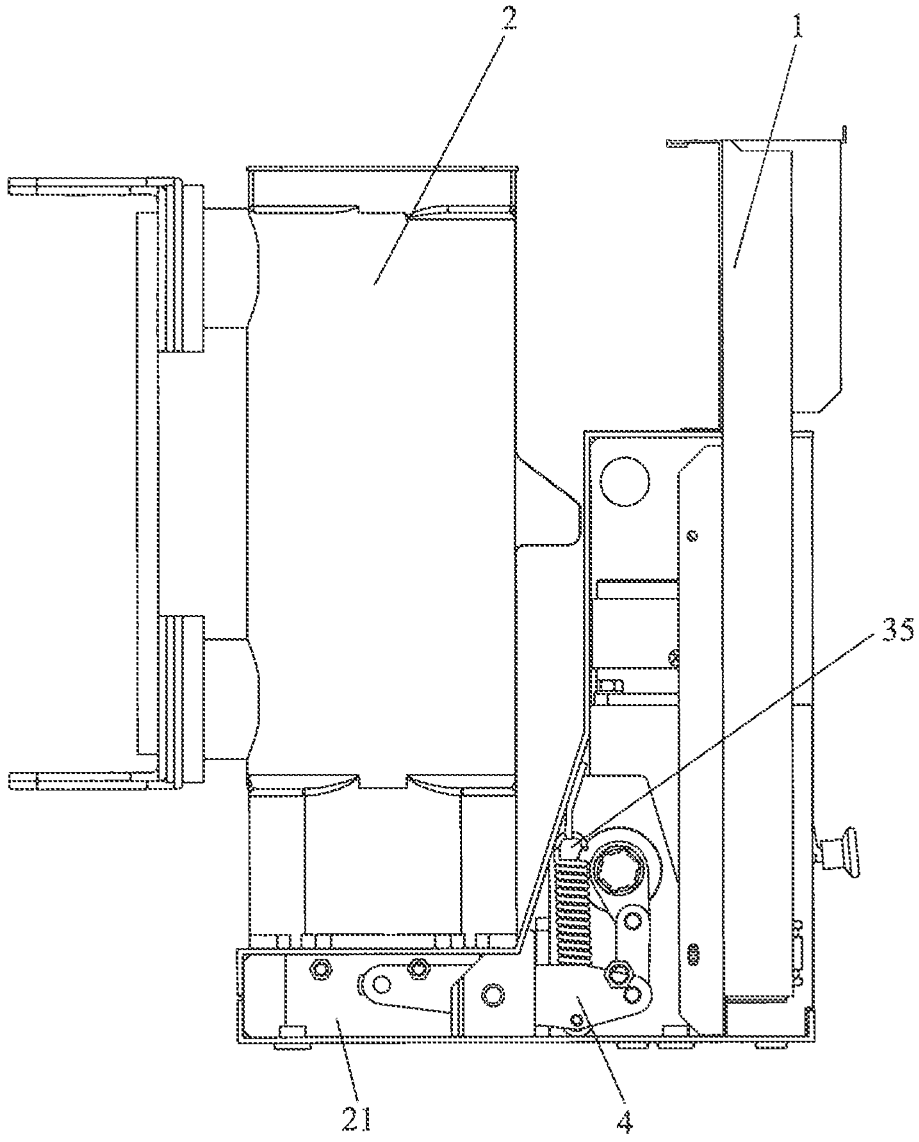
FIG. 2 is a side elevation of the low voltage and intense current phase-controlled switching on equipment shown in FIG. 1.
Figure 3:
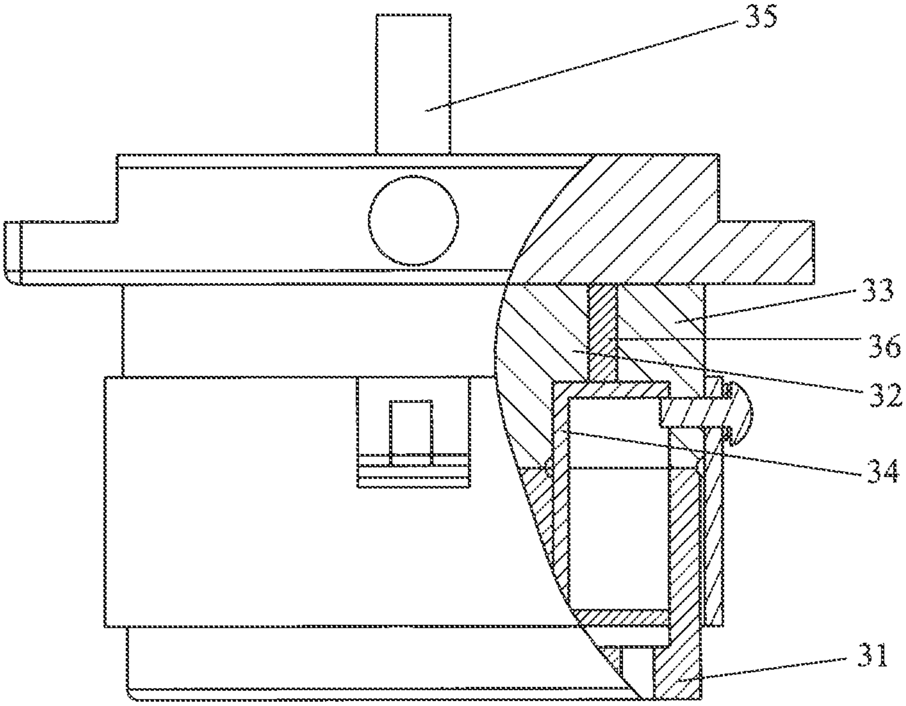
FIG. 3 is a perspective view of a permanent magnet control device according to the embodiment of the present invention.

Referring to FIGS. 1-3, the low voltage and intense current phase-controlled switching on equipment comprises: a frame 1, at least an vacuum arc extinguish chamber 2, at least a permanent magnet control device 3 and at least a intelligent phase choosing controlled module, with the vacuum arc extinguish chamber 2 and the permanent magnet controlled device 3 mounted on the frame 1, wherein the vacuum arc extinguish chamber 2 comprises at least a movable contact and a isolated pull rod 21 connected to the movable contact, and the permanent magnet controlled device 3 comprises a movable iron core 31, a static iron core inner coil 32, a static iron core outside coil 33, a electromagnetic coil 34, a device output shaft 35 and a permanent magnet 36, and the isolated pull rod 21 is arranged to connect to the output shaft 35 via a transmission system 4.

Figure 4:
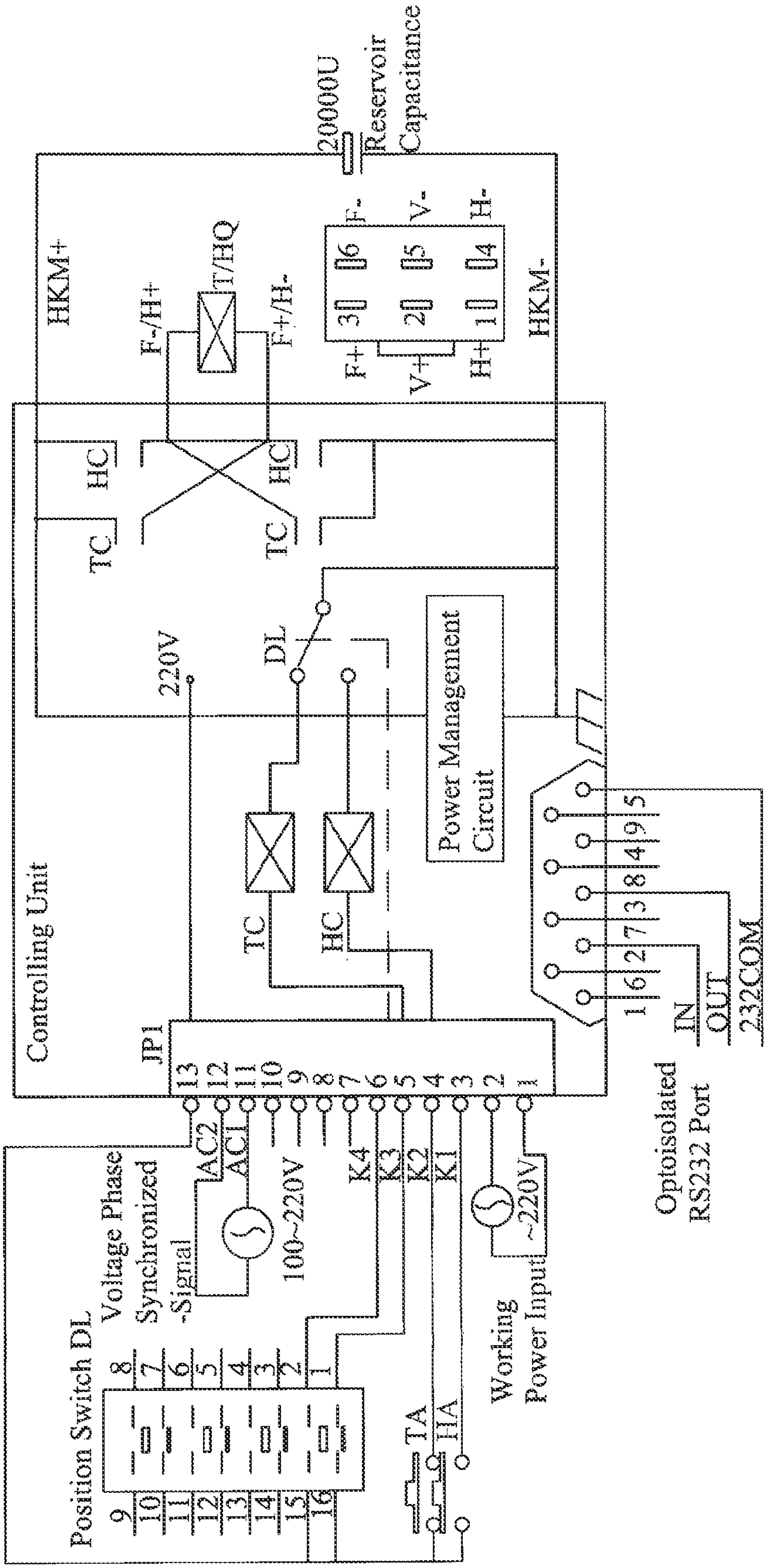
FIG. 4 is an electrical schematic diagram of a intelligent phase choosing controlled module according to the embodiment of the present invention.

Referring to FIG. 4, the intelligent phase choosing controlled module comprises switching on switches, reservoir capacitances, position switches and a controlling unit, and the switching on switches, the reservoir capacitances and the position switches are electrically connected to the controlling unit respectively, wherein the reservoir capacitances are in parallel connected with the electromagnetic coils of the permanent magnet controlled device, and the controlling unit has the switching on mode locking switches set therein, with the switching on mode locking switches equipped with power input ports and voltage phase synchronized-signal input ports, the switching on switches and the switching on mode locking switches both are two-position switch. The switching on mode locking switches are characteristic of two positions, with the two positions electrically connected to the position switches via a coil respectively. The controlling unit includes the jumper terminal JP1 having 13 pins, the ports 1-2 of the jumper terminal JP1 are working power input ports, which are connected to the power supply characteristic of alternating current/direct current 220V±20%; the ports 11-12 of the jumper terminal JP1 are the voltage phase synchronized-signal input ports, which are connected to the power supply characteristic of 100~220V; and the port 13 of the jumper terminal JP1 is a switching on controlling bus, which is connected to the port 3 to form a switching on order controlling loop, and connected to the port 4 to form a switching off order controlling loop. The switching on controlling bus and the ports 5-6 constitute a switching on/off position loop via the switching on mode locking switch, which provide the operation locking controlled logic which is requirement. The low voltage and intense current phase-controlled switching on equipment comprises computer data exchange interfaces matched the jumper terminal JP1, with the jumper terminal JP1 connected to the computer via the computer data exchange interfaces, and the connection relationship of each pin of the jumper terminal JP1 could be defined through programming.

What is claimed is:

1. A low voltage and intense current phase-controlled switching on equipment, comprising: a frame, at least a vacuum arc extinguish chamber, at least a permanent magnet control device and at least an intelligent phase choosing controlled module, with the vacuum arc extinguish chamber and the permanent magnet controlled device mounted on the frame, wherein the vacuum arc extinguish chamber comprises at least a movable contact and an isolated pull rod connected to the movable contact, and the permanent magnet controlled device comprises electromagnetic coils, a movable iron core driven by the electromagnetic coils and an output shaft connected to and driven by the movable iron core, and a transmission system is arranged to connect to the isolated pull rod and the output shaft thereby controlling movement of the movable contact, with the intelligent phase choosing controlled module electrically connected to the electromagnetic coils of the permanent magnet controlled device;

wherein the intelligent phase choosing controlled module comprises: switching on switches, reservoir capacitances, position switches and a controlling unit, and the switching on switches, the reservoir capacitances and the position switches are electrically connected to the controlling unit respectively, wherein the reservoir capacitances are in parallel connected with the electromagnetic coils of the permanent magnet controlled device, and the controlling unit has the switching on mode locking switches set therein, with the switching on mode locking switches equipped with power input ports and voltage phase synchronized-sigal input ports, the switching on switches and the switching on mode locking switches both are two-position switch.

2. The low voltage and intense current phase-controlled switching on equipment as claimed in claim 1, wherein the arc extinguish chamber is mounted within an isolated housing made of epoxy resin.

3. The low voltage and intense, current phase-controlled switching on equipment as claimed in claim 1, wherein the permanent magnet controlled device is constitute of the movable iron cores, a static iron core inner coil, a static iron core outside coil, the electromagnetic coils, a device output shaft, and a permanent magnet.

4. The low voltage and intense current phase-controlled switching on equipment as claimed in claim 1, wherein the switching on mode locking switches are characteristic of two positions, with the two positions electrically connected to the position switches via a coil respectively.

5. The low voltage and intense current phase-controlled switching on equipment as claimed in claim 4, wherein the controlling unit is equipped with a jumper terminal JP1 having a plurality of pins, with one port of the position switch connected to the switching on mode locking switch via the two pins of the jumper terminal JP1, two port of the two positions of the switching on switch connected to the another two pins of the jumper terminal JP1 respectively, and both the other ports of the position switch and the switching on switch connected to the another one pin of the jumper terminal JP1 in parallel, and the power input ports and the voltage phase synchronized-signal input ports are connected to the other pins of the jumper terminal JP1.

6. The low voltage and intense current phase-controlled switching on equipment as claimed in claim 5, wherein the equipment comprises computer data exchange interfaces matched the jumper terminal JP1, with the jumper terminal JP1 connected to the computer via the computer data exchange interfaces, and the connection relationship of each pin of the jumper terminal JP1 could be defined through programming.

7. The low voltage and intense current phase-controlled switching on equipment as claimed in claim 6, wherein the computer data exchange interfaces employ optoisolated RS232 ports.

* * * * *